United States Patent
Schwab

(10) Patent No.: US 6,555,378 B1
(45) Date of Patent: Apr. 29, 2003

(54) METHOD FOR CHECKING THE STATE OF THE GAS FILL IN THE INSULATING CAVITY OF AN INSULATING GLASS PANE, AND INSULATING GLASS PANE

(76) Inventor: Armin Schwab, Sonnenstrasse 2, Fuenfstetten (DE), 86681

( * ) Notice: Subject to any disclaimer, the term of this patent is extended or adjusted under 35 U.S.C. 154(b) by 0 days.

(21) Appl. No.: 09/436,595

(22) Filed: Nov. 9, 1999

(30) Foreign Application Priority Data

Nov. 9, 1998 (DE) .......................................... 198 51 569

(51) Int. Cl.⁷ ............................................ G01N 27/416
(52) U.S. Cl. .................... 436/2; 436/3; 436/6; 219/522
(58) Field of Search ................ 436/183, 2, 3, 436/6; 219/522

(56) References Cited

U.S. PATENT DOCUMENTS 5,543,778 A * 8/1996 Stouffer ..................... 340/539
5,762,739 A * 6/1998 Lenhardt et al. ............ 156/109

FOREIGN PATENT DOCUMENTS

| AT | 394906 B | 7/1992 |
| DE | 2842465 | 4/1980 |
| DE | 3105740 A1 | 8/1982 |
| DE | 3545417 C1 | 4/1987 |
| DE | 4312788 A1 | 10/1994 |
| DE | 19755147 | 9/1999 |
| WO | WO 82/02920 | 9/1982 |
| WO | WO 96/12659 | 5/1996 |

\* cited by examiner

*Primary Examiner*—Jill Warden
*Assistant Examiner*—Sam P. Siefke
(74) *Attorney, Agent, or Firm*—Townsend and Townsend and Crew LLP

(57) ABSTRACT

An insulating glass pane (1) has at least two glass plates (10, 12) which are spaced apart from one another, and an edge joining strip (14) which surrounds and joins together the glass plates (10, 12) in the region of their edges. The edge joining strip (14) seals and delimits an insulating cavity (16) which is located between the glass plates (10, 12) and which is filled with a fill gas which is not air. A sensor (18) is provided in the insulating cavity (16) of the insulating glass pane (1), which sensor reacts and gives a signal if the composition of the fill gas changes.

5 Claims, 2 Drawing Sheets

METHOD FOR CHECKING THE STATE OF THE GAS FILL IN THE INSULATING CAVITY OF AN INSULATING GLASS PANE, AND INSULATING GLASS PANE

BACKGROUND OF THE INVENTION

The invention relates to a method for checking the state of the gas fill in the insulating cavity of an insulating glass pane, and to an insulating glass pane, comprising at least two glass plates which are spaced apart from one another, and an edge joining strip which surrounds and joins together the glass plates in the region of their edges, in which the edge joining strip seals and delimits an insulating cavity which is located between the glass plates, and in which the insulating cavity is filled with a fill gas which is not air.

Insulating glass panes of this nature are generally known. They obtain for example a thermal insulating action by means of the gas fill in the insulating cavity, which is filled with a gas with a poor thermal conductivity and is sealed with respect to the outside by means of the edge joining strip. The fill gas used is often inert gases or other gases or gas mixtures which have a very low thermal conductivity. However, during the service life of an insulating glass pane, the sealing effect of the edge joining strip may deteriorate owing to aging of the sealing means used therein, so that gas is exchanged between the insulating cavity of the insulating glass pane and the surrounding atmosphere. In this event, air gradually enters the insulating cavity, so that the insulating action of the insulating glass pane decreases owing to the thermal conductivity of air, which is better than that of the fill gas.

DE 31 05 740 C2 has disclosed a method for checking the fill gas in insulating glass panes, in which method the passage time of a heat pulse in the fill gas is measured. For this purpose, a small heater plate is provided on a glass plate, and a current pulse is applied, generating a temperature rise on the surface of the heating plate, and a receiver, which detects the temperature rise generated on the heating plate, is provided on the other glass plate. With a given distance between the heating plate and the receiver, the passage time of the temperature pulse between the transmitter and the receiver represents a measure of the insulating action. This known measurement of the insulating action requires a high level of outlay on equipment and can only be carried out as a quality assurance test during production or in the course of special functional checks. It cannot be used to continuously monitor the functioning of the insulating glass pane.

Another method for checking the fill gas in insulating glass panes is known from DE 34 39 216 C1, in which the two adjacent glass plates are subjected to low-frequency mechanical vibrations, while characteristic vibration properties, such as the resonance frequency or direction value, are determined, and these properties again constitute a measure of the insulating action of the insulating glass pane. This method also involves a high level of outlay on equipment and is not suitable for continuous functional testing.

A further method for checking the fill gas in insulating glass panes is known from DE 34 39 405 C2, in which a sound signal is applied to a glass plate, and the propagation velocity of the sound in the pane cavity is determined using a receiver provided on the other glass plate; the composition of the fill gas and therefore of the insulating action can be calculated from the sound propagation velocity. The outlay on equipment which is required means that this method is also unsuitable for continuous monitoring of the insulating action of an insulating glass pane.

SUMMARY OF THE INVENTION

It is an object of the present invention to provide a method and a device which make it possible to monitor the insulating action of an insulating glass pane essentially continuously through the service life of the insulating glass pane and to detect significant deterioration in the insulating action.

That part of the invention which relates to the method is achieved by the fact that a sensor means, which is provided in the insulating cavity of the insulating glass pane, is exposed to the atmosphere in the insulating cavity, and that the sensor means reacts to a change in the composition of the fill gas by giving a signal. Integrating the sensor means in the assembly of the insulating glass pane provides a simple monitoring feature which is inexpensive and does not require a particularly high outlay on equipment.

The sensor means preferably reacts by visibly changing color. The constant visibility of the sensor means in the interior of the insulating glass pane, in conjunction with the change in color, makes it easy to establish a defect in the insulating glass pane.

In a particularly preferred embodiment, the sensor means reacts to a constituent of air, such as oxygen or nitrogen, preferably when this constituent exceeds a threshold value. Consequently, if, during the service life of the insulating glass pane, gas is exchanged between the insulating cavity and the outside atmosphere, the composition of the fill gas or of the fill gas mixture changes, and this is indicated by the signal given by the sensor means. The sensor means can either react to a constituent of the fill gas falling below a threshold or to a constituent of air exceeding a threshold.

In a particularly preferred embodiment, the sensor means reacts to the presence of oxygen above a threshold concentration, in which event the change in color can be seen from the outside and serves to indicate a deterioration in the insulating action of the insulating glass pane.

Another part of the invention is to provide a sensor in the insulating cavity, which sensor reacts and gives a signal if the composition of the fill gas changes.

Preferably, the sensor has a constituent which undergoes a visible change in color in the composition if the fill gas changes.

In this case, that constituent of the sensor which changes color preferably reacts by changing color in the presence of a constituent of air, such as oxygen or nitrogen.

The change in color preferably only takes place in the event of a predeterminable threshold concentration of oxygen or nitrogen being exceeded.

It is particularly advantageous if the sensor is arranged on the inside, facing toward the insulating cavity, of at least one of the glass plates, thus improving the visibility of the sensor.

The sensor is preferably formed by a sensor layer which extends at least along part of the edge of the glass plate, preferably along the entire periphery in the edge region of the glass plate. This sensor layer may be applied to the glass plate by screen printing, for example. If the sensor layer extends along the entire periphery in the edge region of the glass plate, it is possible to determine the site of a leak in the edge region of the insulating glass pane at an early stage, since the sensor layer will change color more quickly in the area of the leak, due to the intensified exchange of gas which takes place in this area.

If the composition of the fill gas or of the fill gas mixture changes, the sensor may also emit an electric signal which can be received by a stationary or mobile evaluation and display unit outside the insulating glass pane. This configuration allows both remote monitoring in a building with a large number of insulating glass panes and monitoring of the insulating action by means of a display unit which is or can be arranged outside the pane. An electric signal which is generated in this way may moreover be assessed as an alarm signal in the event of one of the glass plates being broken if, in such a case, a particularly abrupt change in the composition of the gas is detected.

DESCRIPTION OF THE PREFERRED EMBODIMENTS

Figure 1:
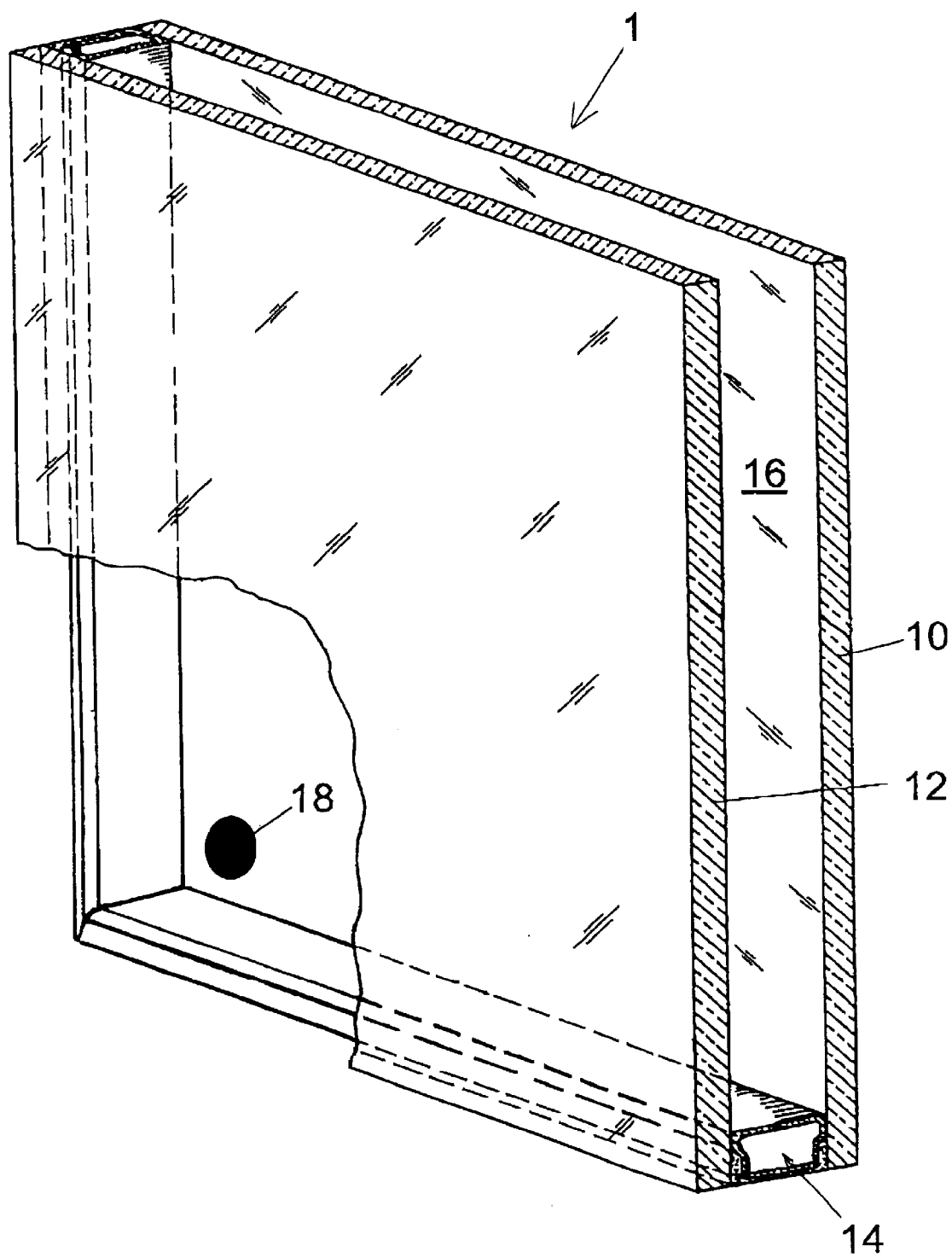
FIG. 1 is a partially sectional illustration of an insulating glass pane according to the invention with a sensor.

FIG. 1 shows a partially sectional view of part of an insulating glass pane 1. The insulating glass pane 1 has an inner glass plate 10 and an outer glass plate 12, which are spaced apart from one another. In the edge region of the glass plates 10, 12, there is an edge joining strip 14 which keeps the glass plates 10, 12 spaced apart in a known way and joins them together in a sealed manner. An insulating cavity 16 is formed between the glass plates 10, 12, which cavity is delimited and hermetically sealed with respect to the environment surrounding the insulating glass pane 1 by the edge joining strip 14 and is filled with a fill gas, which may also be a gas mixture. The fill gas is not air and contains gas constituents which have a very low thermal conductivity, for example inert gases.

On its surface facing toward the insulating cavity 16, the inner glass plate 10 is provided with a sensor 18 in an area which is close to a bottom corner. The sensor comprises, for example, a chemical reagent which has been applied to the glass plate 10 using the screen-printing process. The reagent reacts to the presence of oxygen by changing color.

If the sensor 18 is arranged on the inside of the outer glass plate 12, so that its surface which faces toward the fill gas in the insulating cavity 16 is visible through the inner glass plate 10, i.e. from the interior of a building which is provided with the insulating glass pane 1, it is possible to detect a change in color on this surface of the sensor 18, which is caused by leakage, at an early stage.

The following text explains how the sensor 18 functions, with reference to an example. If, during the service life of the insulating glass pane, the joining edge strip 14 loses its sealing action, for example as a result of the material aging, gas is exchanged between the insulating cavity 16 and the surrounding atmosphere. In the process, fill gas leaves the insulating cavity 16 and/or air from the surrounding atmosphere enters the insulating cavity 16. As long as only the fill gas atmosphere, which does not contain any oxygen or other oxidizing agent, prevails in the insulating cavity 16, the sensor 18 is of a predetermined color. As soon as ambient air enters the insulating cavity 16 where the aging-related leaks arise in the joining edge strip, the oxygen content of about 21 percent which is present in the ambient air causes oxidation of a constituent of the sensor 18 and thus changes the color of the sensor 18, providing an indication that the gas composition in the insulating cavity 16 has changed. As the oxygen content in the gas mixture inside the insulating cavity continues to rise, the color change becomes stronger and more clearly recognizable. Alternatively, the sensor 18 may also be designed in such a way that the color change only takes place above a predetermined oxygen concentration in the gas mixture inside the insulating cavity 16.

Figure 2:
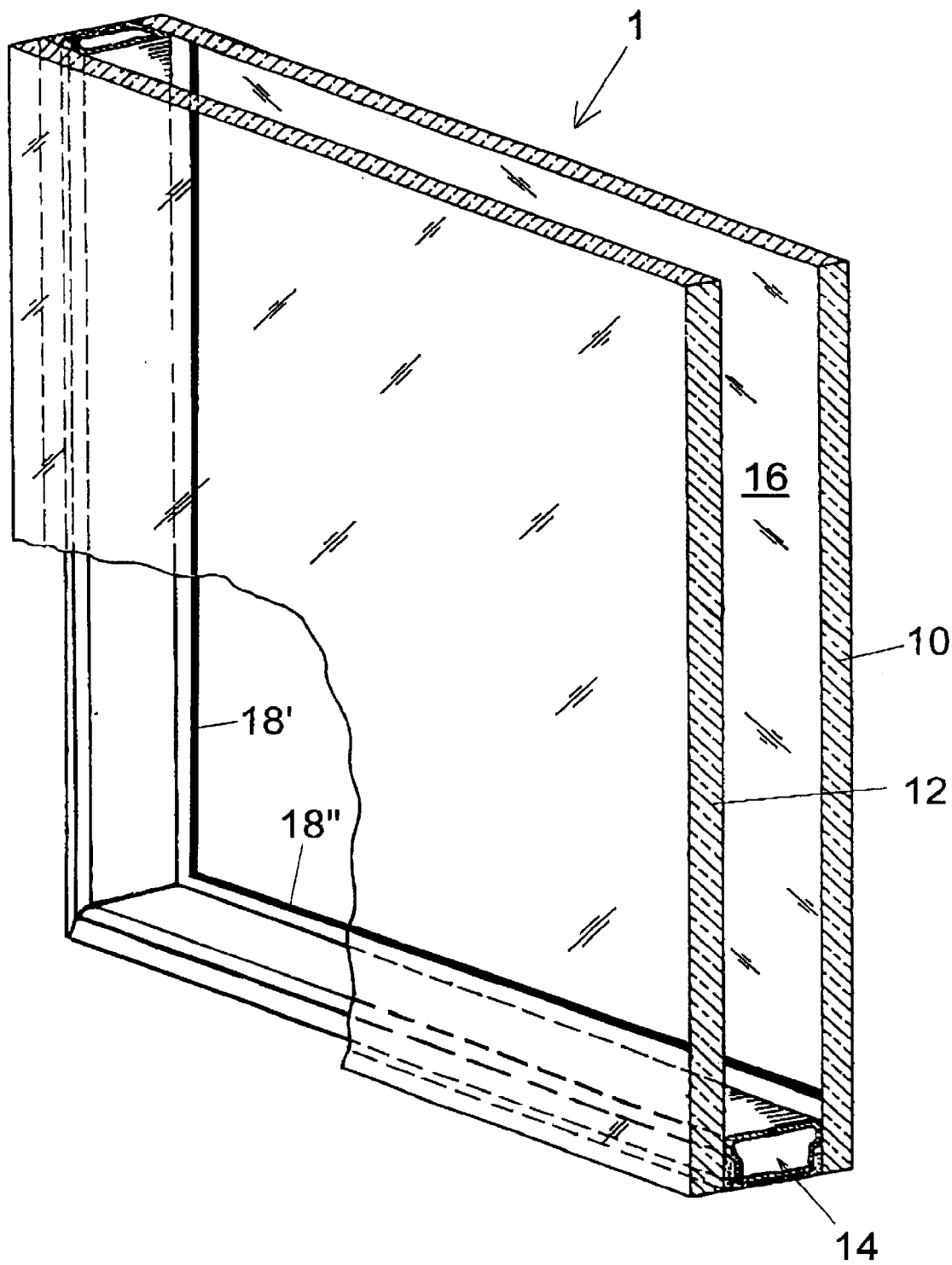
FIG. 2 shows an alternative configuration of the insulating glass pane according to the invention.

FIG. 2 shows an alternative embodiment in which the sensor is formed by a strip-like sensor layer 18', 18" which extends along the entire periphery of the glass plate 10 in its edge area. This configuration makes it possible to determine the location of the leak in the joining edge strip 14 at an early stage as well, since the color change in the sensor layer will be more intensive and will take place earlier in the area of the leak.

The invention is not limited to the above exemplary embodiment, which serves merely to provide a general explanation of the core principle of the invention. Rather, within the scope of protection, the device according to the invention may also adopt different configurations from those described above. In particular, the device may have features which constitute a combination of the respective individual features of the claims.

Alternatively, the sensor or the sensor means may also be designed in such a way that a change in the composition of the fill gas brings about a change in shape of at least part of the sensor. A change in shape of this nature, may, for example, be brought about by shrinkage, expansion, bulging or the like. Furthermore, a change in the composition of the fill gas may also bring about a change in the position of at least part of the sensor. Such changes in position may, for example, be brought about by extension, lifting, sinking, rotation, tilting or the like. In a further alternative embodiment of the invention, a change in the composition of the fill gas may also bring about a change in state of at least part of the sensor, such a change in state being characterized by a transition between the solid, liquid or gaseous phases.

As an alternative to arranging the sensor or the sensor means on a surface of at least one of the two glass plates, the sensor or the sensor means may also be provided on that side of the joining edge strip 14 which faces toward the insulating cavity 16, in particular on an edge spacer belonging to the edge joining strip or on a bracket arranged on the edge joining strip. It is also possible for the sensor means to be arranged on a fibrous structure which is clamped inside the insulating cavity 16.

In a further alternative configuration of the invention, the sensor may also be designed as a plug-in or push-in part which penetrates through the edge joining strip from the outside inward, toward the insulating cavity 16. In this way, the sensor may, for example, at the same time serve as a closure plug or valve for an opening for topping up the fill gas, in which case the sensor means is provided on that section of the closure plug or valve which penetrates into the insulating cavity 16. It is also possible to design the sensor as a shallow stopper which is inserted into a hole in the edge joining strip 14, in which case the stopper, which is open toward the insulating cavity 16, contains in its opening the sensor means, which is placed in the opening as a substrate, for example. In this case, it is advantageous if the stopper comprises a transparent material, at least in the area in which the sensor means is accommodated.

The method according to the invention can also be used as a quality assurance and quality certification measure when producing the insulating glass pane and may, for example, indicate unsatisfactory filling resulting from manufacturing problems.

In principle, the method according to the invention can be applied not only to an insulating glass pane, but also to other gas-filled transparent or nontransparent fluid-filled or gas-filled cavities in which it is necessary to monitor the filling and in which there is direct or indirect visual contact with the sensor or the sensor means.

In particular, the gas fill in the glass pane arrangement may also be a gas or gas mixture which has a different function from that of thermal insulation. For example, it is also possible to provide a fill gas such as sulfur hexafluoride ($SF_6$) which has a sound-insulating action, or another functional gas which, instead of an insulating function, has, for example, an optical function.

Reference numerals given in the claims, the description and the drawings serve merely to provide better understanding of the invention and are not intended to limit the scope of protection.

What is claimed is:

1. An insulating glass pane comprising at least two spaced-apart glass plates, an edge joining strip extending along edges of the glass plates and joining the glass plates to each other, the glass plates and the edge joining strip defining an insulated cavity between the glass plates which is sealed from atmospheric air, a gas other than air filling the insulating cavity, and a sensor in the sealed insulating cavity continuously exposed to the gas therein, the sensor reacting to a change in constituents of the gas with respect to a constituent of atmospheric air and making the change in the constituents of the gas visible when the gas exceeds a predetermined threshold of the constituent of atmospheric air through at least one of a change in color, a change in shape, and a change in state between solid, liquid or gaseous states of at least a part of the sensor.

2. An insulating glass pane according to claim 1 wherein the sensor comprises a sensor layer extending at least along part of an edge of the glass plate.

3. An insulating glass pane according to claim 2 wherein the sensor layer extends along the entire length of the edge regions of the glass plate.

4. An insulating glass pane according to claim 1 wherein the sensor generates an electric signal when the composition of the gas fill in the insulating cavity changes so that the electric signal can be received by an evaluation and display unit which is spaced apart from the insulating glass pane.

5. An insulating glass pane according to claim 1, wherein the sensor is positioned on an inside of at least one of the glass plates and faces towards the insulating cavity.

* * * * *